US012515968B2

(12) United States Patent
Houweling et al.

(10) Patent No.: US 12,515,968 B2
(45) Date of Patent: Jan. 6, 2026

(54) PRETREATMENT TO REMOVE AMMONIA FROM HIGH STRENGTH WASTEWATER WITH MEMBRANE AERATED BIOFILM SIDESTREAM

(71) Applicant: BL TECHNOLOGIES, INC., Minnetonka, MN (US)

(72) Inventors: Dwight Cornelius Houweling, Oakville (CA); Douglas Joseph Thompson, Hamilton (CA); Jeffrey Gerard Peeters, Oakville (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

(21) Appl. No.: 17/052,401

(22) PCT Filed: May 11, 2018

(86) PCT No.: PCT/US2018/032221
§ 371 (c)(1),
(2) Date: Nov. 2, 2020

(87) PCT Pub. No.: WO2019/216906
PCT Pub. Date: Nov. 14, 2019

(65) Prior Publication Data
US 2021/0171375 A1 Jun. 10, 2021

(51) Int. Cl.
*C02F 3/12* (2023.01)
*C02F 3/00* (2023.01)
(Continued)

(52) U.S. Cl.
CPC ............ *C02F 3/1268* (2013.01); *C02F 3/006* (2013.01); *C02F 3/102* (2013.01); *C02F 3/302* (2013.01);
(Continued)

(58) Field of Classification Search
CPC ........ C02F 3/302; C02F 3/1268; C02F 3/006; C02F 3/102; C02F 3/121; C02F 3/12; C02F 3/30
(Continued)

(56) References Cited

U.S. PATENT DOCUMENTS 5,811,009 A * 9/1998 Kos ........................... C02F 3/12
210/903
6,602,417 B1 * 8/2003 Zilverentant ........... C02F 3/302
210/903

(Continued)

FOREIGN PATENT DOCUMENTS

CA 2943072 A1 9/2015
CA 105263871 A 1/2016
(Continued)

OTHER PUBLICATIONS

Bibliothek, English translation, https://catalogplus.tuwien.at/primo-explore/fulldisplay?docid=UTW_alma2176734250003336&context=L&adaptor=Local%20Search%20Engine&vid=UTW&lang=de_DE&search_scope=UTW&tab=default_tab&query=addsrcrid,exact,AC13714664, access date, Jul. 21, 2022, pp. 1-3 (Year: 2022).*

(Continued)

*Primary Examiner* — Claire A Norris

(57) ABSTRACT

Wastewater with high ammonia concentration is pre-treated before discharging it into a wastewater treatment plant treating lower strength wastewater, for example an activated sludge plant treating municipal sewage. The high strength wastewater is pre-treated to oxidize ammonia by contact with a fixed film supported on gas transfer membranes in a membrane aerated biofilm reactor. The pre-treatment may be a batch or continuous process. The pre-treatment can be controlled to remove ammonia to about the point of material alkalinity depletion. One or more parameters such as alka- (Continued)

linity, pH, or membrane exhaust oxygen concentration can be monitored to determine if alkalinity depletion has occurred or is about to occur. In some examples, the high strength wastewater is blended with wastewater having less ammonia and more alkalinity, for example municipal sewage or primary effluent. In some examples, the high strength wastewater is a liquid fraction of one or more sludges.

18 Claims, 1 Drawing Sheet

(51) Int. Cl.
  *C02F 3/10* (2023.01)
  *C02F 3/30* (2023.01)
(52) U.S. Cl.
  CPC ...... *C02F 2209/06* (2013.01); *C02F 2209/07* (2013.01); *C02F 2209/22* (2013.01); *C02F 2301/043* (2013.01)
(58) Field of Classification Search
  USPC ........................................ 210/625, 605, 607
  See application file for complete search history.

(56) References Cited

U.S. PATENT DOCUMENTS

| 7,699,985 | B2 | 4/2010 | Cote et al. |
| 2016/0009578 | A1 | 1/2016 | Cote et al. |
| 2017/0088449 | A1 | 3/2017 | Cote et al. |
| 2018/0044211 | A1 | 2/2018 | Cote et al. |

FOREIGN PATENT DOCUMENTS

| CN | 1789165 | A | 6/2006 | |
| CN | 1807276 | A | 7/2006 | |
| CN | 107055813 | A | 8/2017 | |
| CN | 107381788 | A | 11/2017 | |
| KR | 20010094092 | A | 10/2001 | |
| WO | 9800370 | A1 | 1/1998 | |
| WO | 0005177 | A1 | 2/2000 | |
| WO | WO-2014130042 | A1 * | 8/2014 | ............ C02F 11/02 |
| WO | 2016209235 | A1 | 12/2016 | |

OTHER PUBLICATIONS

Gong et al. "Feasibility of a membrane-aerated biofilm reactor to achieve single-stage autotrophic nitrogen removal based on Anammox", Chemosphere 69, pp. 776-784 (Year: 2007).*
European Patent Application No. 18727623.3 Communication pursuant to Rule 161(1) and 162 EPC dated Dec. 18, 2020.
International Patent Application No. PCT/US2018/032221, International Preliminary Report on Patentability dated Nov. 26, 2020.
International Patent Application No. PCT/US2018/032221, International Search Report and Written Opinion dated Aug. 8, 2018.
Landes et al., "Including Nitrite as an Intermediate in Simultaneous Nitrification/Denitrification Membrane-Aerated Biofilm Reactor Models," Environmental Engineering Science, Mary Ann Liebert, Apr. 2013, vol. 30(10), pp. 606-616.
Syron et al., "Membrane-Aerated Biofilms for High Rate Biotreatment: Performance Appraisal, Engineering Principles, Scale-up, and Development Requirements," Environmental Science & Technology, Mar. 2008, vol. 42 (6), pp. 1833-1844.
Chinese Patent Application No. 201880093334.4, Office Action and Search Report dated Jul. 13, 2022.
European Patent Application No. 18727623.3, European Office Action dated Sep. 19, 2022.
Cote et al., "A New Membrane-Aerated Biofilm Reactor or Low Energy Wastewater Treatment: Pilot Results," Paper submitted for presentation at WEFTEC 2015.
Korean Patent Application No. 20207035487, Office Action dated Dec. 22, 2022.
European Application No. 18727623.3, Minutes of Oral Proceedings dated Jan. 2, 2024.
European Application No. 18727623.3, Decision to Refuse dated Dec. 22, 2023.
European Application No. 18727623.3, Summons to Attend Oral Proceedings dated May 31, 2023.
Chinese Application No. 201880093334.4, Office Action dated Jul. 29, 2023.
Korean Application No. 2020-7035487, Office Action dated Sep. 19, 2023.
Ni, Bing-Jie et al., "Model-based evaluation of the role of Anammox on nitric oxide and nitrous oxide productions in membrane aerated biofilm reactor", Journal of Membrane Science, vol. 446, pp. 332 to 340 (2013).
Australian Patent Application No. 2018422687, Office Action dated Mar. 25, 2024.
Korean Patent Application No. 2020-7035487, Office Action dated May 2, 2024.
Bauer, Heidi et al., "A Battle to Be the Best: A Comparison of Two Powerful Sidestream Treatment Technologies: Post Aerobic Digestion and Anammox", Water Environment Federation/International Water Association, Residuals and Biosolids Conference, Jun. 7-10, 2015, Washington DC., 27 pages.
Bunse, Philipp et al., "Membrane aerated biofilm reactors for mainstream partial nitritation/ anammox: Experiences using real municipal wastewater", Water Research X 9 (2020) 100066, pp. 1-12.
Daigger, Glen T. et al., "Implementation of a Full-Scale Anammox-Based Facility to Treat an Anaerobic Digestion Sidestream at the Alexandria Sanitation Authority Water Resource Facility", Water Practice & Technology vol. 6 No. 2, Jul. 2011, 14 pages.
Cao, Yeshi et al., "Mainstream partial nitritation—anammox in municipal wastewater treatment: status, bottlenecks, and further studies", Appl Microbiol Biotechnol (2017) 101:1365-1383.
Australian Patent Application No. 2018422687, Office Action dated May 22, 2024.
Wastewater Technology Fact Sheet, Side Stream Nutrient Removal, pp. 1-7, published Sep. 2007, U.S. Environmental Protection Agency.†
H. Bauer et al., Sidestream Treatment Comparison of Post Aerobic Digestion and Anammox, pp. 1-26, published Nov. 2015, 20th European Biosolids & Organic Resources Conference, Seminar & Exhibition.†
L. Sun et al., Enhanced biological nitrogen and phosphorus removal using sequencing batch membrane-aerated biofilm reactor, , pp. 559-565, published Oct. 2015, Chemical Engineering Science 135.†
G. Bowden et al., Technologies for Sidestream Nitrogen Removal, pp. 1-110, published 2015, Water Environment Research Foundation, project NUTR1R06w.†
Markus Latschbacher, diploma thesis Evaluation of N2O emissions of MANR treating SDE, pp. 1-41, published May 2017, Technische Universität Wien Institute for Water Quality, Resources and Waste Management, Vienna, Austria.†
E. Syron et al., Performance of a pilot scale membrane aerated biofilm reactor for the treatment of landfill leachate, , pp. 2082-2084, published 2012, Procedia Engineering 44.†
J. Shanahan et al., Alkalinity and pH Effects on Nitrification in a Membrane Aerated Bioreactor: An experimental and model analysis, pp. 10-22, published May 2015, Water Research 74.†
A. Terada et al., Applicability of a Sequencing Batch Membrane Biofilm Reactor for Simultaneous Nitrogen and Phosphorus Removal from Low C/N Ratio Wastewater, pp. 487-496, published Dec. 2013, Journal of Water and Environment technology 11, 6.†
R. Wang et al., Nitrifying population dynamics in a redox stratified membrane biofilm reactor (RSMBR) for treating ammonium-rich wastewater, pp. 48-56, published Mar. 2011, Frontiers of Environmental Science & Engineering in China 5(1).†

\* cited by examiner
† cited by third party

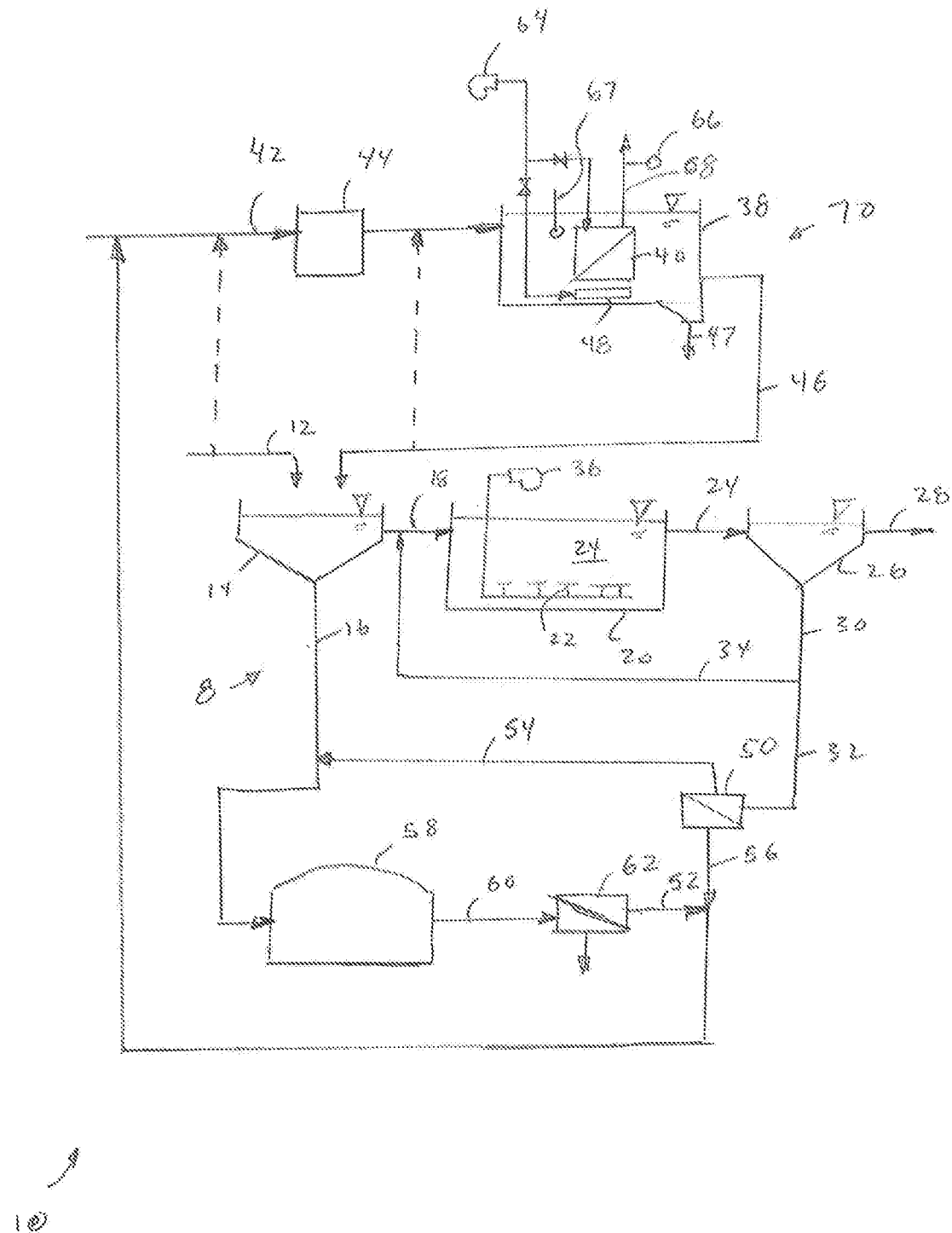

PRETREATMENT TO REMOVE AMMONIA FROM HIGH STRENGTH WASTEWATER WITH MEMBRANE AERATED BIOFILM SIDESTREAM

CROSS-REFERENCE TO RELATED APPLICATIONS

This application is a National Stage Entry of International Application No. PCT/US2018/032221, filed May 11, 2018.

FIELD

This specification relates to wastewater treatment and to membrane aerated biofilm reactors.

BACKGROUND

Many wastewaters with high ammonia concentration, for example those found in industrial effluents or from dewatering municipal sludge, tend to be alkalinity limited. When alkalinity is depleted the pH of the wastewater drops and further biological nitrification is inhibited. This limits the potential to remove ammonia by biological nitrification.

In some treatment processes, chemicals (for example caustic soda) are added to increase the alkalinity of wastewater. In other treatment processes, attempts are made to recover alkalinity biologically, for example by adding a carbon source to enhance biological denitrification or by trying to recover alkalinity through the anammox pathway. However, these processes may be expensive to operate or difficult to control.

In some cases, wastewater with a high ammonia concentration is discharged into a municipal wastewater treatment plant (WWTP). While the high strength wastewater is diluted by low strength wastewater such as municipal sewage also being treated in the WWTP, the ammonia loading to the WWTP increases. This can cause operational problems in the WWTP or cause the effluent ammonia concentration to exceed the effluent ammonia permit.

INTRODUCTION

The following is meant to introduce the reader to the invention, but not to limit or define any claimed invention.

In a process described herein, high strength wastewater (in particular, wastewater with high ammonia concentration) is pre-treated before discharging it into a wastewater treatment plant treating lower strength wastewater, for example an activated sludge plant treating municipal sewage. The high strength wastewater is pre-treated biologically by contact with a fixed film supported on gas transfer membranes. The pre-treatment may be a batch or continuous process. In some examples, the pre-treatment is controlled to remove ammonia to about the point of material alkalinity depletion. Optionally, one or more parameters such as alkalinity, pH, or membrane exhaust oxygen concentration can be monitored to determine if alkalinity depletion has occurred or is about to occur. In some examples, the high strength wastewater is blended with wastewater having less ammonia relative to its non-ammonia alkalinity, for example wastewater having much more than 1 mol of alkalinity per mol of ammonia (more than 3.57 mg $CaCO_3$ equivalent per mg $NH_4^+$—N), for example municipal sewage or primary effluent. Optionally, the high strength wastewater may include a liquid fraction of one or more of anaerobic digester sludge, primary sludge, or activated sludge, for example a liquid fraction of anaerobic digester sludge.

In a system described herein a membrane aerated biofilm reactor (MABR) is combined with an activated sludge system. The MABR includes one or more membrane aerated biofilm modules. The system is configured so that the MABR receives high strength wastewater and discharges an effluent to the activated sludge system. In use, oxygen is supplied to the modules and an attached growth is present in the MABR in the form of a fixed film supported by gas transfer membranes of the modules. Ammonia (i.e. ammonium or $NH_4^+$—N) is nitrified or otherwise oxidized in an attached biofilm and thereby removed from the high strength wastewater feed water before it enters the activated sludge system. Optionally, a portion of municipal sewage flowing to the activated sludge system may also be treated in the MABR before being treated in a process tank of the activated sludge system. Optionally, the system may be configured to convey a liquid fraction of one or more sludges generated in the activated sludge system or an anaerobic digester to the MABR as the high strength wastewater.

BRIEF DESCRIPTION OF FIGURES

The FIGURE is a process flow diagram of a wastewater treatment plant 10.

DETAILED DESCRIPTION

High strength wastewater can have, for example, 1000 mg/L or more of ammonia. In some cases, the high strength wastewater may also be alkalinity-deficient, meaning that the wastewater does not have enough alkalinity to allow for biological nitrification of all of the ammonia in the wastewater. In a process to be described in more detail below, the high strength wastewater is treated by way of biological oxidation (i.e. nitrification) in the biofilm of a membrane aerated biofilm reactor (MABR) before being treated further in an activated sludge process. The high strength wastewater may be treated in a continuous flow or batch feed process in the MABR. Optionally, the MABR does not have collection and recycle of active solids and so does not have material suspended growth. Effluent from the MABR may be mixed with, for example, low strength wastewater such as municipal sewage, optionally by blending the MABR effluent with, for example, influent wastewater, primary effluent, mixed liquor or return activated sludge in an activated sludge plant. Optionally, the high strength wastewater may be diluted, for example with belt filter press washwater, before being treated in the MABR.

Optionally, the MABR can be operated so as to remove ammonia to about the point of alkalinity depletion. In a batch feed process, for example, the batch reaction can be ended when alkalinity is depleted to about a level at which pH depression becomes inhibitory to biological activity. The lack of sufficient alkalinity may be determined by directly measuring alkalinity and/or ammonia, or by measuring a related parameter such as pH or membrane exhaust oxygen concentration or both. For example, alkalinity depletion can be indicated by a pH of wastewater in the MABR at or below a specified threshold value, for example a value in the range of about 6 to 6.5. Alkalinity depletion can also be indicated by a rapid increase in membrane exhaust oxygen concentration, for example relative to an average concentration over a preceding hour or more., or by membrane exhaust oxygen concentration at or above a specified threshold, for example a value in the range of about 15% to 15.5% or a different range determined by site specific conditions. An increase in membrane exhaust oxygen concentration that is not attributable to a change in oxygen feed rate indicates that microorganisms in the biofilm are being inhibited from oxidizing (i.e. nitrifying) ammonia. A continuous MABR process may also be configured to operate at about the point of alkalinity depletion by adjusting one or more process parameters such as feed rate or residence time upon sensing alkalinity depletion. However a continuous process may be more difficult to control than a batch process while allowing for variations in process conditions (i.e. diurnal variations in influent sewage flow rates) and so might require a higher pH threshold or lower membrane exhaust oxygen concentration threshold.

Optionally, wastewater with a lower ammonia to alkalinity ratio may be mixed with the high strength water and treated in the MABR. Adding lower ammonia to alkalinity wastewater (for example municipal sewage or primary effluent of municipal sewage) allows for removal of more ammonia in the MABR. Optionally, the amount of lower ammonia to alkalinity wastewater added can be varied over time to reduce the effect of variations in other process conditions. Optionally, the blend of high strength wastewater to lower ammonia to alkalinity wastewater can be adjusted to achieve at least a sufficient ratio of alkalinity to ammonia in the combined stream such that ammonia removal in the MABR is not limited by lack of alkalinity. For example, the combined stream may be blended to have at least about 2 mol alkalinity per mol of ammonia (7.14 mg $CaCO_3$ eq per mg $NH_4$ as N).

The FIGURE shows a wastewater treatment system 10. Wastewater 12, for example municipal sewage, is fed into a primary clarifier 14. The primary clarifier 14 produces primary sludge 16 and primary effluent 18. Primary effluent 18 flows into one or more process tanks 20. In the example shown, process tank 20 has a grid of aerators 22, for example fine bubble aerators. The aerators 22 are supplied with air from a blower 36 in an amount sufficient to keep mixed liquor 24 aerobic at least while it is in the process tank 20. Mixed liquor 24 flows to a secondary clarifier 26. Secondary clarifier 26 produces plant effluent 28 and activated sludge 30. The activated sludge 30 is split into waste activated sludge 32 and return activated sludge 34. Return activated sludge 34 returns to process tank 20.

Some suspended solids in the wastewater are removed in the primary clarifier 14. In other examples, the primary clarifier 14 is not present and influent suspended solids pass through the process tank 20 to the secondary clarifier 26. Some of the remaining organic compounds (i.e. biological oxygen demand (BOD)) are removed by suspended biomass in the process tank 20. In particular, ammonia is converted to nitrate by nitrifying bacteria. In other activated sludge systems, more process tanks 20 are added. For example, adding an anoxic tank allows total nitrogen to be reduced by way of a denitrification process. The primary clarifier 14, if any, one or more process tanks 20 and secondary clarifier 26 form an activated sludge reactor or system 8.

An MABR tank 38 contains one or more membrane aerated biofilm modules (MABM) 40. MABR aerators 48, for example coarse bubble aerators or pulsing aerators, are added below the MABM 40 to periodically scour the biofilm and/or refresh water in or around the MABM 40. Excess biofilm released form the MABM 40, or solids that settle in the MABR tank 38, can be removed as MABR solids 47. MABR solids 47 can be removed directly from the MABR tank 38 as shown or from a downstream separator. Optionally, MABR solids 47 can be sent to an anaerobic digester 58.

High strength wastewater 42 flows into the MABR tank 38. Optionally, an equalization tank 44 may be added to allow the flow rate of high strength wastewater 42 to be adjusted. Optionally, a screen may be added upstream of the MABR tank 38 to protect the MABM 40 from large solids or excessive amounts of fibers or hair. High strength wastewater 42 has a higher ammonia concentration than wastewater 12.

MABR effluent 46 flows to the process tank 20 optionally directly or by being blended with the wastewater 12 or primary effluent 18 or added to the primary clarifier 14. The flow of MABR effluent 46 to the process tank 20 may be continuous or intermittent. In another option, a portion of the MABR effluent 46 (which can temporarily include all of the MABR effluent 46) may be continuously or periodically recycled to the MABR tank 38. This can be done, for example, to mix the contents of the MABR tank 38 or to adjust the residence time of the MABR tank 38.

In the example shown, waste activated sludge 32 passes through a thickener 50. The thickener 50 produces thickened waste activated sludge (TWAS) 54 and filtrate 56. TWAS 54 and primary effluent 16 are treated in an anaerobic digester 58. Digestate (alternatively called digester sludge) 60 is separated in dewaterer 60 to produce a centrate 52. Centrate 52 and filtrate 56 make up high strength wastewater 42. In other examples, the primary sludge 16 may also pass through the same thickener 50 or a different thickener, or waste activated sludge 32 might not be thickened, such that filtrate 56 could be a liquid fraction of one or both of the waste activated sludge 32 and primary sludge 16. In other examples, only one or the sludges may be treated in digester 58 or there might be no digester 58. In another option, digestate 60 may be thickened rather than dewatered.

Any type of solid-liquid separation device may be used for thickener 50 or dewaterer 60. While sludge from the activated sludge process is typically thickened and sludge from an anaerobic digester is typically dewatered, the concentration of the solids fraction from either does not need to be within either a thickening or dewatering range. The words "filtrate" and "centrate" are used for convenience to refer to a liquid fraction of solid-liquid separation generally and are not limited to the specific products or a filter or centrifuge. In other options, only one of the filtrate 56 or centrate 52 makes up high strength wastewater 42. In other examples, the high strength wastewater 42 might be entirely or partially supplied from a source outside of system 10, for example from industrial (i.e. industrial process, agricultural or mining) wastewater.

MABR blower 64 supplies air to the MABM 40. The MABR aerators 48 can receive air from blower 64 (or another blower) directly or in the form of exhaust air that has passed through the MABM 40. The MABR aerators 48 typically receive air only periodically. The flow of air to the MABM 40 is typically on. The flow rate can be modulated or constant. The air flow rate can be selected to prevent oxidation (i.e. nitrification) in the biofilm from being inhibited by lack of oxygen. In the case of a modulated airflow, the rate can be varied considering one or more process measurements, for example ammonia concentration in the influent or water in the MABR tank 38. An oxygen concentration sensor 66 can be provided on an oxygen exhaust line 68 from one or more of the MABM 40. A pH sensor 69 can be provided in communication with wastewater in the MABR tank 38.

The MABM 40, MABR tank 38 and associated equipment such as blower 64 and MABR aerators 48 forms a membrane aerated biofilm reactor (MABR) 70. The high strength wastewater 42 is treated first in the MABR 70. Nitrification takes place on a fixed biofilm that grows on membranes of the MABM 40. Since the biofilm is attached, the MABR 70 does not require capture of mixed liquor suspended solids in a clarifier or with a filtration membrane or other solid separation device.

In one option, the MABR 70 is operated in a batch process. High strength wastewater 42 maybe drawn periodically from equalization tank 44 and added to MABR tank 38. Alternatively, high strength wastewater 42 may be added to MABR tank 38 as it is produced, for example in a WWTP that performs sludge dewatering for 4-12 hours per day. A corresponding amount of MABR effluent 46 is sent to the activated sludge reactor 8. The amount of high strength wastewater 42 added to start a new batch may be about equal to or less than the volume of the MABR tank 38. Ammonia oxidizing (i.e. nitrifying) bacteria are maintained in the MABR 70 between batches because they remain in a biofilm attached to the membrane media.

Optionally, a batch may be maintained until the alkalinity of the high strength wastewater 42 is materially depleted. Material depletion of alkalinity can be signaled, for example, by the pH decreasing to or below a specified threshold, for example a threshold in the range of 6 to 6.5. Alternatively, material depletion of alkalinity can be signaled, for example, by the membrane exhaust oxygen concentration increasing rapidly, increasing to or above a specified threshold for example a threshold in the range of 15% to 15.5%, or increasing relative to a plot of oxygen concentration to ammonia concentration produced without alkalinity depletion and at the same or a correlated oxygen feed rate. When material alkalinity depletion is imminent or has occurred to a small degree, the reactor is flushed and at least some its contents replaced with a fresh batch of wastewater.

In another option, the MABR is operated in a continuous process. In continuous mode operation, the high strength, alkalinity-deficient wastewater is blended with lower strength alkalinity-abundant dilution water. The blending ratio can be optionally adjusted to maintain an alkalinity to ammonia ratio within a selected range or above a selected threshold. For example, the blending ratio can be selected to provide at least 2 mol alkalinity per mol of ammonia in the wastewater blend. Alternatively, the blending ratio can be selected to be sufficient to avoid material depletion of alkalinity as signaled, for example, by a pH at or above a specified threshold for example in the range of 6 to 6.5; the membrane exhaust oxygen concentration being at or above a specified threshold for example a threshold in the range of 15% to 15.5%, or the membrane exhaust oxygen concentration being above a plot of oxygen concentration to ammonia concentration produced without alkalinity depletion and at the same or a correlated oxygen feed rate.

In the MABR, oxygen is delivered to the ammonia oxidizing (i.e. nitrifying) organisms in the biofilm through the supporting membranes in a "bubble-less" diffusion process. The diffusion based gas transfer process is more efficient than fine bubble aeration. De-nitrification can be provided in an anoxic outer layer of the biofilm, in bulk water outside of the biofilm, or in an anoxic zone of the wastewater treatment plant. Optionally, the process may use "shortcut" nitrogen removal pathways i.e. nitrite shunt, partial nitritation, or partial nitritation/anammox (deammonification) rather than conventional nitrification-denitrification.

Additional information regarding MABRs and their operation can be found in US Publication Number 2016/0009578 A1, Membrane Assembly for Supporting a Biofilm; US Publication Number 2017/0088449 A1, Wastewater Treatment with Primary Treatment and MBR or MABR-IFAS Reactors; and, International Publication Number WO 2016/209235 A1, Floating Apparatus for Membrane Biofilm Reactor and Process for Water Treatment, which are incorporated herein by reference.

US Publication Number 2016/0009578 A1, Membrane Assembly for Supporting a Biofilm, describes a cord for supporting a biofilm. The cord has a plurality of yarns, including at least one yarn having a plurality of hollow fiber gas transfer membranes. A module has a plurality of the cords potted in at least one header. A reactor has a module immersed in a tank of water to be treated. Air is supplied to the module and a biofilm forms over the cords.

US Publication Number 2017/0088449 A1, Wastewater Treatment with Primary Treatment and MBR or MABR-IFAS Reactors, describes various processes for treating wastewater. A gas transfer membrane is immersed in water and pressurized air is supplied to the membrane. In one example, the gas transfer membranes are added to a process tank in an activated sludge reactor. The membrane supports an oxygenated nitrifying biofilm, which is immersed in an anoxic suspended biomass in the tank.

International Publication Number WO 2016/209235 A1, Floating Apparatus for Membrane Biofilm Reactor and Process for Water Treatment, describes an apparatus having a plurality of gas transfer membranes. The apparatus floats in water with the membranes submerged in the water. The apparatus can be added to a process tank in a conventional activated sludge reactor.

EXAMPLE

A membrane aerated biofilm reactor (MABR) was operated at a municipal waste water treatment plant. The MABR was used to reduce ammonia in filtrate from a filter-press fed with anaerobic digester sludge. The MABR was operated as a batch process. 130 L batches of filtrate were added to the MABR and recirculated through the MABR tank which had a volume of 800 L. Each batch was operated by displacement, wherein 130 L was added to the existing 800 L, displacing 130 L out of the process. The filtrate contained 1960 mg/L ammonia, 4690 mg/L alkalinity, 2180 mg/L COD. After a batch of filtrate was added to the MABR tank, the concentration in the tank was about 740 mg/L of ammonia and 800 mg/L of alkalinity. Each batch was operated for three to five days, and during that time process air supplied to the membranes of the MABR modules was the sole oxygen source for nitrification. During each batch the ammonia concentration in the reactor was measured periodically, along with pH, alkalinity, nitrate, nitrite, and COD. The exhaust gas from the MABR modules was also measured for oxygen concentration to determine the mass transfer of oxygen through the membranes. A batch was considered complete when alkalinity was depleted to the point of inhibiting nitrification, which was indicated by the pH decreasing to about 6.5 or less.

Ammonia measurements from the batch testing resulted in observed nitrification rates between 3.5 and 17 g-$NH_4$—N/d/$m^2$, measured as the mass of ammonia nitrified per day per square meter of membrane surface area. The average observed nitrification rate was 8.4 g-$NH_4$—N/d/$m^2$. The percentage removal of ammonia during each batch was 20%, and was limited by the alkalinity available in the filtrate.

Corresponding oxygen transfer rates ranged from 18 to 28 $g\text{-}O_2/d/m^2$, averaging 20.3 $g\text{-}O_2/d/m^2$.

As a secondary test, volatile fatty acids (VFA), sourced from an acid-phase digester on site, was added to the MABR at the end of a batch run, (i.e. when nitrification had slowed due to lack of alkalinity and pH was <6) to provide carbon for denitrification. The purpose was to test the ability of the system to produce alkalinity by denitrification that could be used for further nitrification by the MABR. The test proved effective and produced further nitrification at rates averaging 6.2 $g\text{-}NH_4\text{---}N/d/m^2$.

Aeration efficiency rates for the MABR modules ranged from 3.3 to 5 $kg\text{-}O_2/kWh$, averaging 4.5 $kg\text{-}O_2/kWh$ under batch test conditions. Typical fine bubble aeration efficiency rates range from 1-2 $kg\text{-}O_2/kWh$. The MABR modules were more energy efficient than fine bubble aeration for removal of side stream ammonia loads, based on these test conditions. The amount of oxygen consumed per unit of ammonia removed was less than the amount required for nitrification indicating that at least some ammonia might be removed in the MABR by nitritation or another ammonia oxidation pathway.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A process for treating wastewater comprising the steps of,
    a) treating at least a first portion of a first wastewater by way of an activated sludge process;
    b) pre-treating a second wastewater with a membrane aerated biofilm contained in a membrane aerated biofilm reactor (MABR) to produce an effluent with reduced ammonia concentration;
    c) treating the effluent with reduced ammonia concentration in the activated sludge process,
    wherein the second wastewater comprises one or more of (i) a higher concentration of ammonia than the first wastewater, (ii) a liquid fraction of one or more sludges and (iii) a second portion of the first wastewater,
    and wherein excess biofilm released in the MABR is separated as solids from the effluent with reduced ammonia concentration that is treated in the activated sludge process and sent to an anaerobic digester.

2. The process of claim 1 further comprising treating the second portion of the first wastewater with the membrane aerated biofilm without first treating the second portion of the first wastewater in the activated sludge process.

3. The process of claim 1 wherein the second wastewater comprises a liquid fraction of one or both of primary sludge and waste activated sludge produced in the activated sludge process.

4. The process of claim 1 wherein the second wastewater comprises a liquid fraction of anaerobic digester sludge.

5. The process of claim 4 wherein the anaerobic digester sludge is produced by digestion of one or both of primary sludge and waste activated sludge produced in the activated sludge process.

6. The process of claim 1 wherein the second wastewater has 1000 mg/L or more of ammonia prior to blending, if any, with the second portion of the first wastewater or another lower ammonia-higher alkalinity dilution water.

7. The process of claim 1 wherein pre-treating the second wastewater with the membrane aerated biofilm comprises treating the second wastewater in a batch process to the point of material alkalinity depletion.

8. The process of claim 1 comprising treating the second portion of the first wastewater with the membrane aerated biofilm without first treating the second portion of the first wastewater in the activated sludge process wherein the second portion is sufficient to allow the ammonia in the second wastewater to be nitrified without alkalinity depletion.

9. The process of claim 1 comprising treating the second portion of the first wastewater with the membrane aerated biofilm without first treating the second portion of the first wastewater in the activated sludge process wherein the second portion is sufficient to produce a combined wastewater having at least about 2 mol alkalinity per mol of ammonia.

10. The process of claim 1 comprising monitoring one or more of alkalinity, pH, and membrane exhaust oxygen concentration in step b).

11. The process of claim 1 comprising selecting (a) a duration of a batch in a batch process with the membrane aerated biofilm or (b) a ratio of the first wastewater to the second wastewater when a second portion of the first wastewater is treated with the membrane aerated biofilm, based on a measurement of pH or membrane exhaust oxygen concentration.

12. The process of claim 1 wherein pre-treating the second wastewater with the membrane aerated biofilm comprises adding alkalinity to the second wastewater.

13. The process of claim 1 wherein the effluent with reduced ammonia concentration has a pH of 6.5 or less.

14. The process of claim 1 wherein pre-treating the second wastewater comprises deammonification.

15. A system for treating wastewater comprising,
    a) a membrane aerated biofilm reactor (MABR) having an inlet and an outlet;
    b) an activated sludge system having an inlet, an effluent outlet and one or more sludge outlets;
    c) a solid-liquid separation unit having an inlet and a liquid fraction outlet, wherein
    d) the outlet from the MABR is connected to the activated sludge system;
    e) the inlet of the solid liquid separation unit is connected to the one or more sludge outlets directly or via an anaerobic digester; and,
    f) the liquid fraction outlet of the solid-liquid separation unit is connected to the inlet of the MABR;
    wherein the system is configured for removal of excess biofilm released from the membrane aerated biofilm as solids either (i) directly from the MABR, or (ii) from a separator downstream of the MABR and is configured for sending the excess biofilm to the anaerobic digester.

16. The system of claim 15 wherein the MABR further comprises a pH meter or oxygen concentration meter.

17. The system of claim 15 wherein the inlet of the MABR is further connected to a source of non-biologically treated sewage.

18. The system of claim 15 wherein the inlet of the activated sludge system is further connected to a source of non-biologically treated sewage.

\* \* \* \* \*